(12) United States Patent
Nibe

(10) Patent No.: US 9,307,500 B2
(45) Date of Patent: Apr. 5, 2016

(54) WIRELESS APPARATUS, BASEBAND PROCESSING APPARATUS, AND COMMUNICATION METHOD

(71) Applicant: FUJITSU LIMITED, Kawasaki-shi, Kanagawa (JP)

(72) Inventor: Keiji Nibe, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 36 days.

(21) Appl. No.: 14/321,887

(22) Filed: Jul. 2, 2014

(65) Prior Publication Data
US 2014/0313906 A1 Oct. 23, 2014

Related U.S. Application Data

(63) Continuation of application No. PCT/JP2012/058738, filed on Mar. 30, 2012.

(51) Int. Cl.
*H04W 52/24* (2009.01)
*H04W 52/20* (2009.01)
*H04W 52/48* (2009.01)

(52) U.S. Cl.
CPC .............. *H04W 52/24* (2013.01); *H04W 52/20* (2013.01); *H04W 52/48* (2013.01)

(58) Field of Classification Search
None
See application file for complete search history.

(56) References Cited

U.S. PATENT DOCUMENTS

| | | | | |
|---|---|---|---|---|
| 6,397,043 | B1 * | 5/2002 | Kang | H04W 52/143 455/522 |
| 6,449,463 | B1 * | 9/2002 | Schiff | H04W 52/12 455/115.3 |
| 7,274,912 | B2 | 9/2007 | Sommer | |
| 7,327,987 | B2 | 2/2008 | Miyamoto et al. | |
| 8,588,352 | B2 | 11/2013 | Nibe | |
| 2004/0008631 | A1 | 1/2004 | Kim | |

(Continued)

FOREIGN PATENT DOCUMENTS

| | | |
|---|---|---|
| CN | 1476268 A | 2/2004 |
| JP | 11032077 A | 2/1999 |

(Continued)

OTHER PUBLICATIONS

First Notification of Office Action issued for corresponding Chinese Patent Application No. 201280068355.3 mailed on May 25, 2015 with a full English translation.

(Continued)

*Primary Examiner* — Min Jung
(74) *Attorney, Agent, or Firm* — Myers Wolin, LLC

(57) ABSTRACT

A wireless apparatus includes a wireless unit to convert a wireless signal received by an antenna into a baseband signal; and a baseband processing apparatus to receive a packet corresponding to the baseband signal via a communication line connected with the wireless unit, to detect an error in a transmission process of the packet via the communication line, to obtain the baseband signal based on packets other than the packet in which the error is detected, to generate transmission power information used for downlink transmission power control based on the obtained baseband signal, to transmit the baseband signal having the generated transmission power information reflected to the wireless unit via the communication line, and to have the wireless unit execute wireless transmission of a wireless signal corresponding to the baseband signal having the transmission power information reflected.

6 Claims, 12 Drawing Sheets

(56) References Cited

U.S. PATENT DOCUMENTS

| | | | |
|---|---|---|---|
| 2006/0014558 A1* | 1/2006 | Takaki | H04W 52/20 455/522 |
| 2008/0132267 A1* | 6/2008 | Cave | H04L 1/0021 455/522 |
| 2008/0299984 A1 | 12/2008 | Shimomura et al. | |
| 2011/0105110 A1* | 5/2011 | Carmon | H04W 52/143 455/422.1 |
| 2012/0331365 A1* | 12/2012 | Nibe | H04L 1/0061 714/748 |

FOREIGN PATENT DOCUMENTS

| | | |
|---|---|---|
| JP | 2002026807 A | 1/2002 |
| JP | 2004505538 A | 2/2004 |
| JP | 2004201152 A | 7/2004 |
| JP | 2009071497 A | 4/2009 |
| JP | 2010268395 A | 11/2010 |
| JP | 2011072014 A | 4/2011 |
| WO | 2012032623 A1 | 3/2012 |

OTHER PUBLICATIONS

International search report issued for corresponding international application No. PCT/JP2012/058738, mailed May 29, 2012.

3GPP TS 25.211 V11.0.0; 3rd Generation Partnership Project; Technical Specification Group Radio Access Network; "Physical channels and mapping of transport channels onto physical channels (FDD) (Release 11)"; Dec. 2011.

* cited by examiner

100

| DigRF PACKET ADDRESS | ERROR SYMBOL INFO | PILOT SYMBOL RANGE INFO |
|---|---|---|
| 0 | 0 | |
| 1 | 0 | 1 |
| 2 | 0 | 1 |
| 3 | 0 | 1 |
| 4 | 0 | 1 |
| 5 | 0 | 1 |
| 6 | 0 | 1 |
| 7 | 0 | 1 |
| 8 | 0 | 1 |
| 9 | 0 | 1 |
| 10 | 0 | 1 |
| 11 | 0 | 1 |
| 12 | 0 | 1 |
| 13 | 0 | 1 |
| 14 | 0 | 1 |
| 15 | 0 | 1 |
| 16 | 0 | 1 |
| 17 | 0 | 1 |
| 18 | 1 (ERROR FOUND) | 0 (INVALID CALCULATION) |
| 19 | 0 | 1 |
| 20 | 0 | 1 |
| 21 | 0 | 1 |
| 22 | 0 | 1 |
| 23 | 0 | 1 |
| 24 | 0 | 1 |
| 25 | 0 | 1 |
| 26 | 0 | 1 |
| 27 | 0 | 1 |
| 28 | 0 | 1 |
| 29 | 0 | 1 |
| 30 | 0 | 1 |
| 31 | 0 | 1 |

FIG.4

WIRELESS APPARATUS, BASEBAND PROCESSING APPARATUS, AND COMMUNICATION METHOD

CROSS-REFERENCE TO RELATED APPLICATIONS

This application is a continuation application of International Application PCT/JP2012/058738 filed on Mar. 30, 2012 and designated the U.S., the entire contents of which are incorporated herein by reference.

FIELD

The disclosures herein generally relate to a wireless communication apparatus.

BACKGROUND

A wireless apparatus built in a cellular phone or the like includes a wireless unit (also called a "radio frequency (RF) unit") and a baseband processing apparatus. The interface between the wireless unit and the baseband processing apparatus is configured with lines including an analog signal line and a digital or analog control line.

In recent years, an RFIC (RF Integrated Circuit) included in a wireless unit can be made from a CMOS (Complementary Metal-Oxide Semiconductor) circuit. The RFIC can include an analog-digital converter (ADC) and a digital-analog converter (DAC).

Following this, an interface has been standardized for digital signal connection between an RFIC and a digital IC for baseband processing. The interface standardized for digital signal connection between an RFIC and a digital IC includes "DigRF".

Version 3 of the DigRF standard (DigRF v3) is for an LVDS transmission frequency of about 300 MHz, and a DigRF packet does not include an error determination bit. Therefore, according to Version 3 of the DigRF standard, if an error occurs in a DigRF packet, retransmission control is not executed.

In contrast to DigRF v3, Version 4 of the DigRF standard (DigRF v4) is for an LVDS transmission frequency of about 1 GHz, and an error determination bit is provided in a DigRF packet. Therefore, in DigRF v4, error detection is executed for data between an RFIC and a baseband processing apparatus, and if an error is detected, retransmission control is executed for the data (see, for example, Patent Document 1). For example, when data is transmitted from an RFIC to a baseband processing apparatus, the baseband processing apparatus executes error detection in the data from the RFIC. If detecting an error in the data from the RFIC, the baseband processing apparatus makes a retransmission-request of the data to the RFIC. In response to receiving the retransmission-request of the data, the RFIC transmits the data again to the baseband processing apparatus.

RELATED-ART DOCUMENTS

Patent Documents

[Patent Document 1] Japanese Laid-open Patent Publication No. 2010-268395

Non-Patent Document

[Non-Patent Document 1] 3GPP TS25.211 V11.0.0, "5.3.2 Dedicated downlink physical channels", 2011-12

When a retransmission process of data is executed in data transmission from a wireless unit to a baseband processing apparatus as described above, timing for the baseband processing apparatus to start a baseband process is delayed for time required for the retransmission process. Consequently, a process in the baseband processing apparatus cannot be completed within the time specified in the 3GPP (3rd Generation Partnership Project) specification, and, for example, there are cases where a delay occurs for timing of transmission power control.

The 3GPP specification specifies that a user terminal (also called "user equipment (UE)") receives a wireless signal, for example, a dedicated physical channel (DPCH) from a base station (see, for example, Non-Patent Document 1). It is specified that such a user terminal demodulates a pilot symbol included in the DPCH, and calculates an SIR (Signal-to-Interference Ratio). It is also specified that such a user terminal maps information about power control based on reception power, into a dedicated physical control channel (DPCCH).

For a downlink DPCH, a delay offset of 296 chips at maximum is generated during a soft handover (SHO). Therefore, considering the maximum delay of the DPCH, the user terminal has to transmit an uplink DPCCH having the information about power control based on the received power mapped, at a timing of 216 chips after the reception of the pilot symbol.

However, when a retransmission process of data is executed at the DigRF interface between the wireless unit and the baseband processing apparatus in the wireless terminal, the baseband processing apparatus waits for the retransmission of a DigRF packet. Therefore, if the user terminal cannot transmit the uplink DPCCH having the information about power control based on the received power mapped, at a timing of 216 chips after the reception of the pilot symbol, the user terminal is forced to wait for a next transmission timing to transmit the uplink DPCCH having the information about power control based on the received power mapped.

Therefore, if a retransmission process is executed for data at a connection interface between elements in a wireless terminal, and if a required process is not completed within a process time specified in the 3GPP specification, transmission power control may be delayed in the downlink direction.

SUMMARY

According to at least an embodiment of the present invention, a wireless apparatus includes a wireless unit to convert a wireless signal received by an antenna into a baseband signal; and a baseband processing apparatus to receive a packet corresponding to the baseband signal via a communication line connected with the wireless unit, to detect an error in a transmission process of the packet via the communication line, to obtain the baseband signal based on packets other than the packet in which the error is detected, to generate transmission power information used for downlink transmission power control based on the obtained baseband signal, to transmit the baseband signal having the generated transmission power information reflected to the wireless unit via the communication line, and to have the wireless unit execute wireless transmission of a wireless signal corresponding to the baseband signal having the transmission power information reflected.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 4 illustrates an example of a process for specifying a range of pilot symbols used for calculating a transmission TPC bit;

DESCRIPTION OF EMBODIMENTS

In the following, embodiments of the present invention will be described with reference to the drawings. Note that elements having the same functions across the drawings are assigned the same numerical codes, and their description may not be repeated.

<Wireless Apparatus 100>

Figure 1:
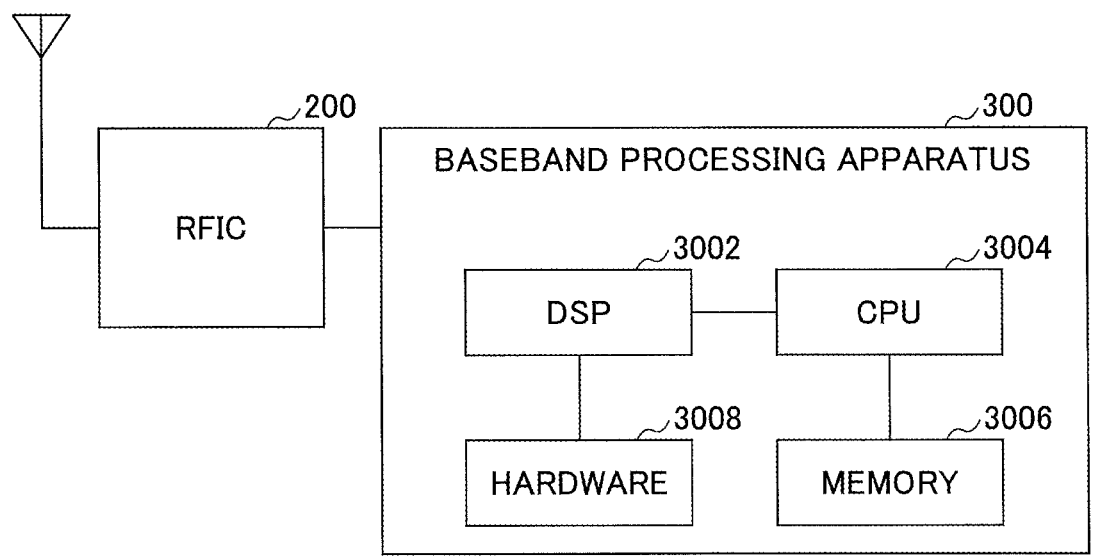
FIG. 1 illustrates a wireless apparatus according to an embodiment of the present invention.

FIG. 1 illustrates a wireless apparatus 100 according to an embodiment of the present invention. FIG. 1 mainly illustrates an example of a hardware configuration. The wireless apparatus 100 is built in a user terminal, for example.

The user terminal may be any terminal appropriate for wireless communication, which includes a cellular phone, an information terminal, a personal digital assistant, a portable personal computer, and a smart phone, but it is not limited to these. The wireless apparatus 100 may also be built in an image forming apparatus or a household electric appliance.

In the present embodiment, the wireless apparatus 100 is described for a case where wireless access is executed in accordance with WCDMA (Wideband Code Division Multiple Access), but it may be executed in accordance with another method such as LTE (Long Term Evolution) or LTE-Advanced.

In the present embodiment, the wireless apparatus 100 is described for a case where the SIR is used as reception quality, but other indicators may be used.

The wireless apparatus 100 includes an RFIC 200 and a baseband processing apparatus 300. The RFIC 200 and the baseband processing apparatus 300 may be implemented in semiconductor integrated circuits, respectively. The baseband processing apparatus 300 can be manufactured as a semiconductor integrated circuit by converting a program written in a circuit design language into circuit information by a compiler.

The RFIC 200 receives a wireless signal from another wireless apparatus, and inputs the wireless signal into the baseband processing apparatus 300. Also, the RFIC 200 converts the signal from the baseband processing apparatus 300 into a wireless signal, and transmits the wireless signal to the other wireless apparatus. The other wireless apparatus includes a wireless base station.

The baseband processing apparatus 300 is connected with the RFIC 200. For example, the baseband processing apparatus 300 and the RFIC 200 are connected with each other by an interface using digital signal based connection. The interface includes "DigRF". The baseband processing apparatus 300 executes a baseband process for the digital signal from the RFIC 200. Also, the baseband processing apparatus 300 inputs the digital signal to be transmitted, into the RFIC 200.

The baseband processing apparatus 300 includes a DSP (Digital Signal Processor) 3002, a CPU (Central Processing Unit) 3004, a memory 3006, and hardware 3008.

The DSP 3002 executes baseband signal processing based on instructions from the CPU 3004. The DSP 3002 generates data to be transmitted to the other wireless apparatus based on instructions from the CPU 3004, and executes control for inputting the data into the RFIC 200.

The CPU 3004 is connected with the DSP 3002. The CPU 3004 has the DSP 3002 execute digital signal processing based on software such as built-in firmware and a program stored in the memory 3006.

The memory 3006 is connected with the CPU 3004. The memory 3006 stores the program executed by the DSP 3002 and the CPU 3004.

The hardware 3008 is connected with the DSP 3002. The hardware 3008 executes a modulation process, an encoding process, a demodulation process, and various calculations.

Figure 2A:
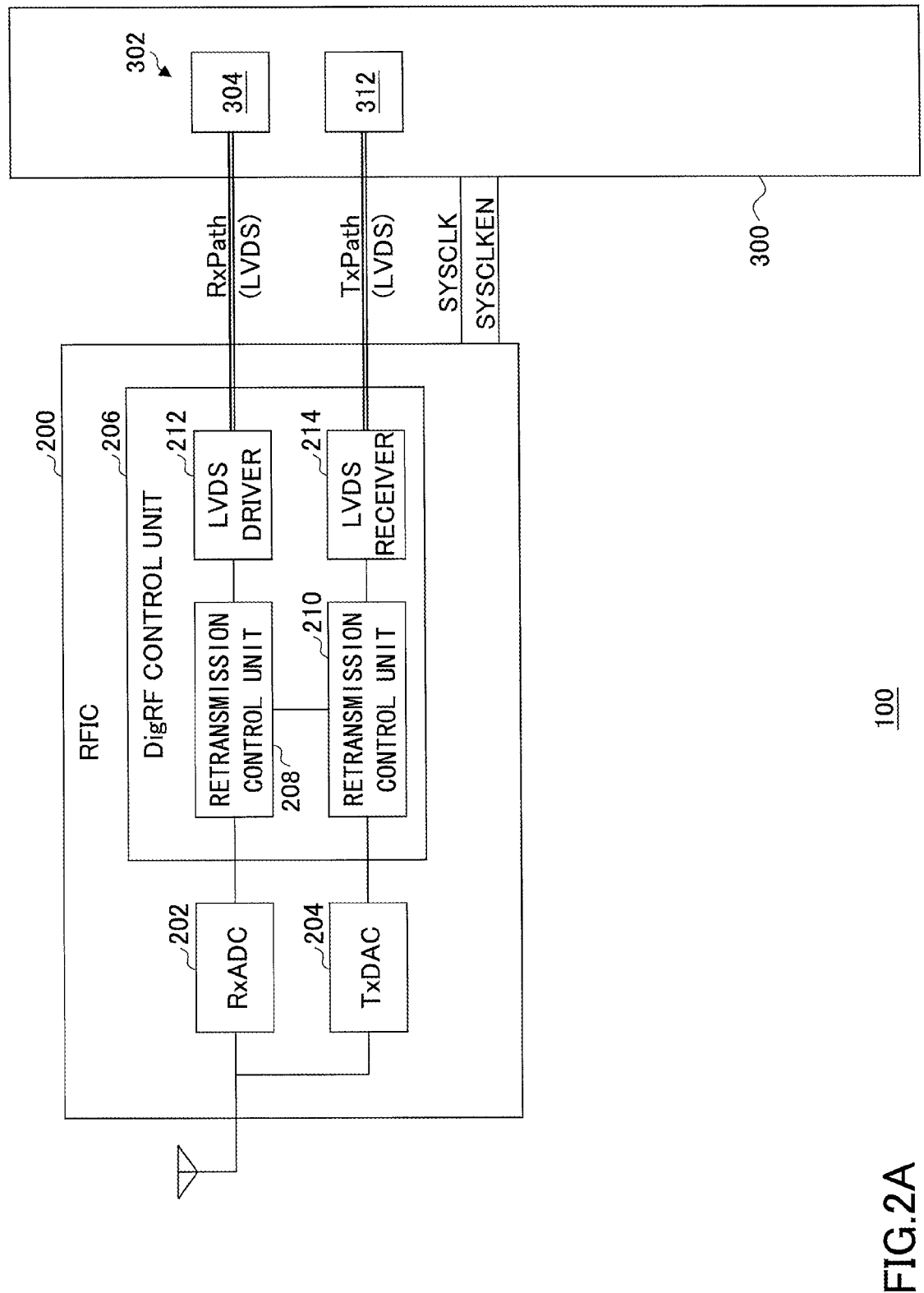
FIG. 2A is a functional block diagram of a wireless apparatus according to an embodiment of the present invention.
Figure 2B:
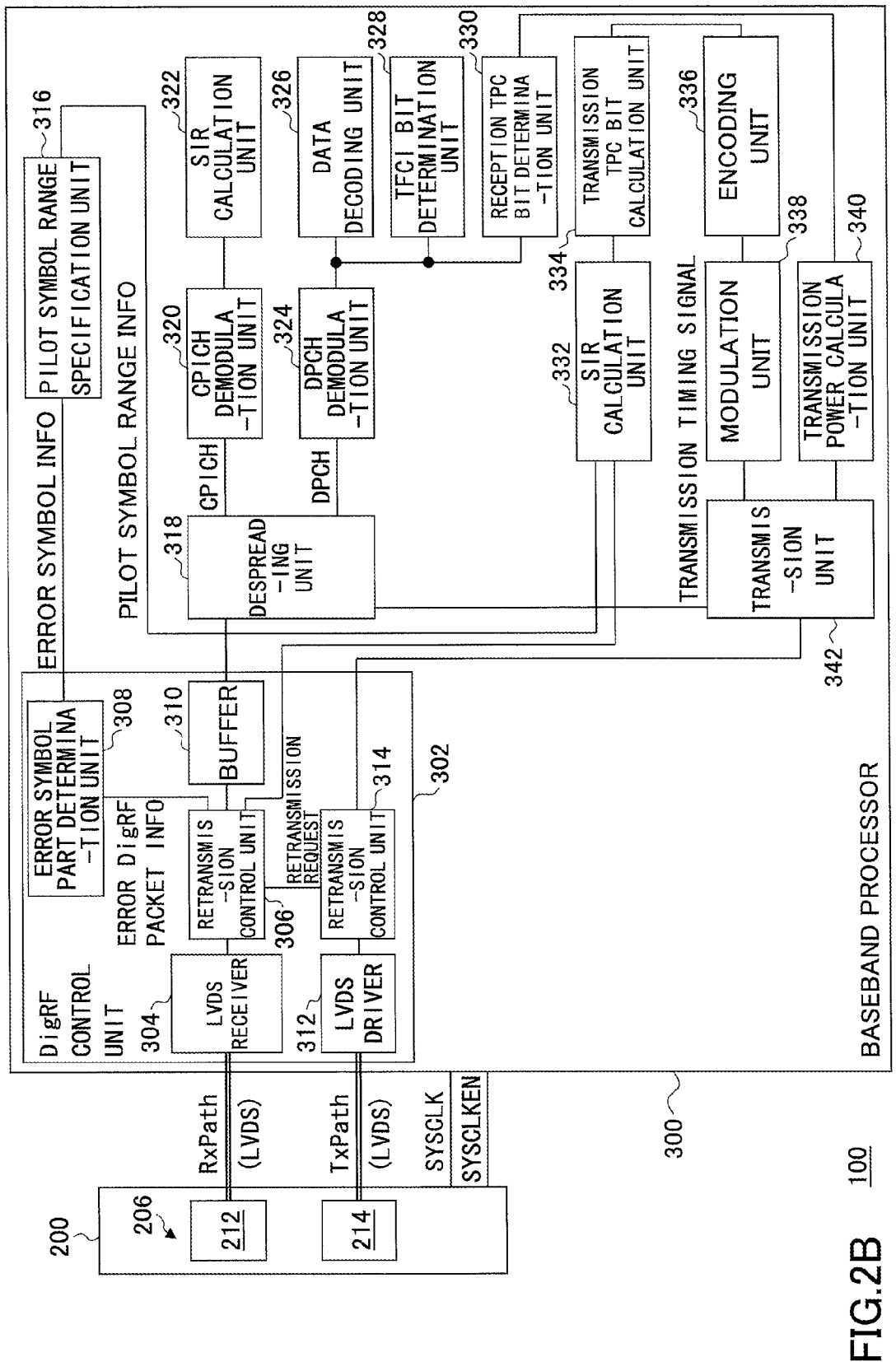
FIG. 2B is a functional block diagram of a wireless apparatus according to an embodiment of the present invention.

FIGS. 2A-2B are functional block diagrams of the wireless apparatus 100 according to the present embodiment.

The wireless apparatus 100 includes the RFIC 200 and the baseband processing apparatus 300. FIG. 2A mainly illustrates the RFIC 200 in the present embodiment. FIG. 2B mainly illustrates the baseband processing apparatus 300 in the present embodiment.

The RFIC 200 executes reception/transmission of a wireless signal with the other wireless apparatus via an antenna.

The baseband processing apparatus 300 is connected with the RFIC 200 via digital communication paths (RxPath and TxPath). The baseband processing apparatus 300 executes a baseband process for a DigRF-packeted signal from the RFIC 200. Also, the baseband processing apparatus 300 inputs DigRF-packeted data into the RFIC 200.

<RFIC 200>

The RFIC 200 includes an RxADC 202, a TxDAC 204, and a DigRF control unit 206. The DigRF control unit 206 includes a retransmission control unit 208, a retransmission control unit 210, an LVDS (Low Voltage Differential Signaling) driver 212, and an LVDS receiver 214.

The RxADC 202 receives a wireless signal from the other wireless apparatus via the antenna, and converts the wireless signal into a digital signal. The RxADC 202 inputs the digital signal into the retransmission control unit 208. Note that other circuit elements (not illustrated) may be inserted between the antenna and the RxADC 202, and between the RxADC 202 and the DigRF control unit 206.

The retransmission control unit 208 is connected with the RxADC 202. The retransmission control unit 208 executes buffering for the digital signal from the RxADC 202. The retransmission control unit 208 inputs the digital signal from the RxADC 202 to the LVDS driver 212. Also, if receiving a retransmission-request signal as input from the retransmission control unit 210, the retransmission control unit 208 inputs a digital signal corresponding to the retransmission-request among the buffered digital signals, into the LVDS driver 212.

The LVDS driver 212 is connected with the retransmission control unit 208. The LVDS driver 212 generates a DigRF packet of the digital signal from the retransmission control unit 208. The LVDS driver 212 executes a LVDS drive process for the DigRF-packeted signal (referred to as a "DigRF packet" below). Namely, the LVDS driver 212 outputs the DigRF packet to the baseband processing apparatus 300 via the RxPath.

The LVDS receiver 214 receives a transmission signal or a retransmission-request signal from the baseband processing apparatus 300, and inputs it into the retransmission control unit 210.

The retransmission control unit 210 is connected with the LVDS receiver 214 and the retransmission control unit 208. The retransmission control unit 210 inputs a transmission signal from the LVDS receiver 214 into the TxDAC 204. Also, the retransmission control unit 210 inputs a retransmission-request signal from the LVDS receiver 214 into the retransmission control unit 208.

The TxDAC 204 is connected with the retransmission control unit 210. The TxDAC 204 converts the transmission signal from the retransmission control unit 210 into an analog signal. The TxDAC 204 converts the transmission signal having been converted into the analog signal, into a wireless signal, and transmits the wireless signal to the other wireless apparatus via the antenna. Note that other circuit elements (not illustrated) may be inserted between the antenna and the TxDAC 204, and between the TxDAC 204 and the DigRF control unit 206.

<Baseband Processor 300>

The baseband processing apparatus 300 includes a DigRF control unit 302, a pilot symbol range specification unit 316, a despreading unit 318, a CPICH demodulation unit 320, and an SIR calculation unit 322.

The baseband processing apparatus 300 also includes a DPCH demodulation unit 324, a data decoding unit 326, a TFCI (Transport Format Combination Indicator) bit determination unit 328, and a reception TPC bit determination unit 330.

The baseband processing apparatus 300 also includes an SIR calculation unit 332, a transmission TPC bit determination unit 334, an encoding unit 336, a modulation unit 338, a transmission power calculation unit 340, and a transmission unit 342.

The DigRF control unit 302 includes an LVDS receiver 304, a retransmission control unit 306, an error symbol part determination unit 308, a buffer 310, an LVDS driver 312, and a retransmission control unit 314.

The error symbol part determination unit 308, the pilot symbol range specification unit 316, the TFCI bit determination unit 328, and the reception TPC bit determination unit 330 are executed by the CPU 3004 based on the program stored in the memory 3006. Alternatively, the error symbol part determination unit 308, the pilot symbol range specification unit 316, the TFCI bit determination unit 328, and the reception TPC bit determination unit 330 may be executed by the CPU 3004 based on the firmware stored in an internal memory of the CPU 3004.

The retransmission control unit 306 and 314, the despreading unit 318, and the transmission unit 342 are executed by the DSP 3002.

The LVDS receiver 304, the buffer 310, the LVDS driver 312, the CPICH demodulation unit 320, the SIR calculation unit 322, the DPCH demodulation unit 324, and the data decoding unit 326 are executed by the hardware 3008. Also, the SIR calculation unit 332, the transmission TPC bit determination unit 334, the encoding unit 336, the modulation unit 338, and the transmission power calculation unit 340 are executed by the hardware 3008.

The LVDS receiver 304 is connected with the LVDS driver 212. The LVDS receiver 304 receives a DigRF packet from the RFIC 200 via the RxPath. The LVDS receiver 304 inputs the DigRF packet from the RFIC 200 into the retransmission control unit 306.

The retransmission control unit 306 is connected with the LVDS receiver 304. The retransmission control unit 306 detects a data error in the DigRF packet from the LVDS receiver 304.

Figure 3:
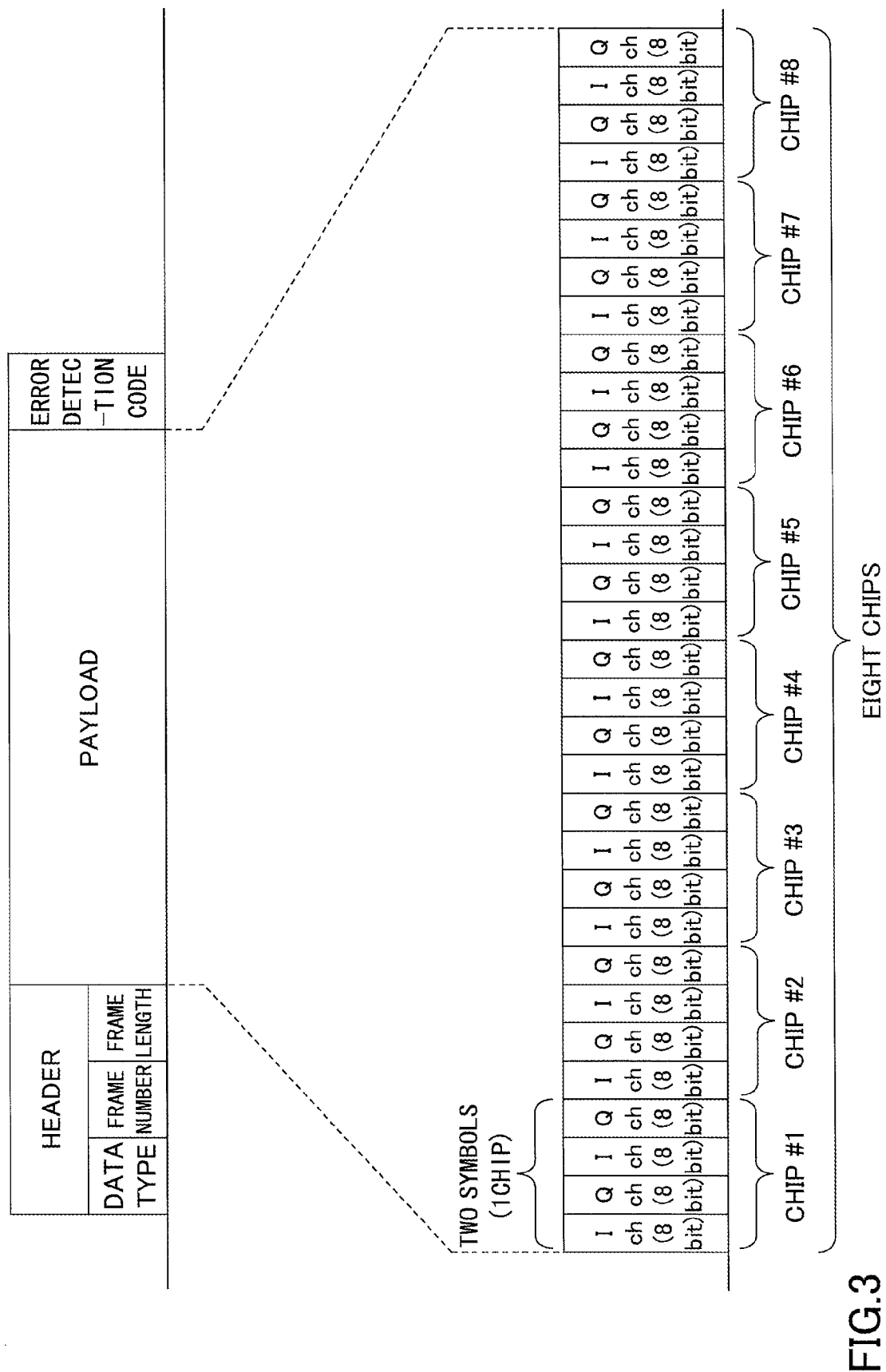
FIG. 3 illustrates an example of a DigRF packet.

FIG. 3 illustrates an example of a DigRF packet.

The DigRF packet includes a header, a payload, and an error detection code.

The header includes information representing a data type, information representing a frame number, and information representing a frame length.

The payload includes one or more symbols. In the example illustrated in FIG. 3, the payload includes 16 symbols. In the example illustrated in FIG. 3, the payload includes eight chips denoted as chip #1 to chip #8. Namely, one chip includes two symbols. One chip includes two pieces of I data (I channel (ch)) and two pieces of Q data (Q channel (ch)). An I ch and a Q ch are represented with eight bits, respectively. One packet includes eight chips, and one chip includes two I channels and two Q channels.

The error detection code is used for determining whether an error is included in data included in the payload. The error detection code includes, for example, a cyclic redundancy check (CRC) code.

The retransmission control unit 306 makes a retransmission-request to the retransmission control unit 314 if an error is detected in data included in a DigRF packet. If an error is detected in data included in a DigRF packet, the retransmission control unit 306 inputs information representing the DigRF packet in which the error is detected (referred to as "error DigRF packet information" below) into the error symbol part determination unit 308. Specifically, if an error is detected in data included in a DigRF packet, the retransmission control unit 306 inputs the information representing the frame number included in the header of the DigRF packet in which the error is detected, into the error symbol part determination unit 308.

Also, the retransmission control unit 306 stores the DigRF packet in the buffer 310, and inputs the DigRF packet into the SIR calculation unit 332.

Also, if the DigRF packet from the LVDS receiver 304 is a retransmission packet, the retransmission control unit 306 replaces a DigRF packet stored in the buffer 310 with the retransmission DigRF packet. The retransmission control unit 306 executes control for inputting the DigRF packet stored in the buffer 310 into the despreading unit 318.

The retransmission control unit 314 is connected with the retransmission control unit 306. The retransmission control unit 314 inputs a transmission signal from the transmission unit 342 to the LVDS driver 312. Also, in response to a retransmission-request from the retransmission control unit 306, the retransmission control unit 314 inputs the retransmission-request signal into the LVDS driver 312.

The LVDS driver 312 is connected with the retransmission control unit 314 and the LVDS receiver 214. The LVDS driver 312 generates a DigRF packet of the retransmission-request signal from the retransmission control unit 314. The LVDS driver 312 inputs the DigRF-packeted retransmission-request signal into the RFIC 200.

Also, the LVDS driver 312 generates a DigRF packet of the transmission signal from the retransmission control unit 314. The LVDS driver 312 inputs the DigRF-packeted transmission signal into the RFIC 200.

The despreading unit 318 is connected with the buffer 310. The despreading unit 318 applies despreading to the DigRF packet from the buffer 310. The despreading unit 318 separates the DigRF packet having despreading applied into channels. Specifically, the despreading unit 318 separates the DigRF packet having despreading applied into a common pilot channel (CPICH) and a dedicated physical channel (DPCH). The despreading unit 318 inputs the CPICH into the CPICH demodulation unit 320. Also, the despreading unit 318 inputs the DPCH into the DPCH demodulation unit 320. Moreover, the despreading unit 318 inputs a transmission timing signal into the transmission unit 342.

The CPICH demodulation unit 320 is connected with the despreading unit 318. The CPICH demodulation unit 320 demodulates the CPICH from the despreading unit 318. The CPICH demodulation unit 320 inputs the demodulated CPICH into the SIR calculation unit 322.

The SIR calculation unit 322 is connected with the CPICH demodulation unit 320. The SIR calculation unit 322 calculates an SIR based on the demodulated CPICH from the CPICH demodulation unit 320.

The DPCH demodulation unit 324 is connected with the despreading unit 318. The DPCH demodulation unit 324 demodulates the DPCH from the despreading unit 318. The DPCH demodulation unit 324 inputs the demodulated DPCH into the data decoding unit 326, the TFCI bit determination unit 328, and the reception TPC bit determination unit 330.

The data decoding unit 326 is connected with the DPCH demodulation unit 324. The data decoding unit 326 decodes the demodulated DPCH from the DPCH demodulation unit 324.

The TFCI bit determination unit 328 is connected with the DPCH demodulation unit 324. The TFCI bit determination unit 328 determines a TFCI bit based on the demodulated DPCH from the DPCH demodulation unit 324.

The reception TPC bit determination unit 330 is connected with the DPCH demodulation unit 324. The reception TPC bit determination unit 330 determines whether the TPC bit included in the demodulated DPCH from the DPCH demodulation unit 324 indicates an up or a down. The reception TPC bit determination unit 330 inputs information representing whether the TPC bit included in the demodulated DPCH from the DPCH demodulation unit 324 indicates an up or a down (referred to as "reception TPC bit information" below), into the transmission power calculation unit 340.

The transmission power calculation unit 340 is connected with the reception TPC bit determination unit 330. The transmission power calculation unit 340 calculates transmission power of the DPCCH and DPDCH based on the reception TPC bit information from the reception TPC bit determination unit 330. The transmission power calculation unit 340 inputs information representing the calculation result of the transmission power of the DPCCH and DPDCH, into the transmission unit 342.

The error symbol part determination unit 308 is connected with the retransmission control unit 306. The error symbol part determination unit 308 determines an error symbol location based on the error DigRF packet information from the retransmission control unit 306. The error symbol part determination unit 308 inputs information representing the error symbol location (referred to as "error symbol information" below) into the pilot symbol range specification unit 316.

The pilot symbol range specification unit 316 is connected with the error symbol part determination unit 308. The pilot symbol range specification unit 31 specifies a range of pilot symbols used for calculating a TPC bit to be transmitted to the other wireless apparatus based on the error symbol information from the error symbol part determination unit 308.

The pilot symbol range specification unit 316 inputs information representing the range of pilot symbols used for calculating a TPC bit to be transmitted to the other wireless apparatus (referred to as "pilot symbol range information" below) into the SIR calculation unit 332.

FIG. 4 illustrates a process executed by the pilot symbol range specification unit 316. FIG. 4 illustrates a table including multiple DigRF packets where each record stores whether an error is detected in each of the packets. The table is used for obtaining a range of pilot symbols used for calculating a TPC bit to be transmitted to the other wireless apparatus (referred to as a "transmission TPC bit" below).

The pilot symbol range specification unit 316 in the present embodiment provides the table where the address of a DigRF packet is associated with the error symbol information and the pilot symbol range information.

The pilot symbol range specification unit 316 specifies the pilot symbol range with multiple DigRF packets as a unit. The pilot symbol range specification unit 316 specifies pilot symbols included in DigRF packets other than the DigRF packet that includes the error symbol specified by the error symbol information, as the pilot symbol range information.

The pilot symbol range specification unit 316 in the embodiment specifies the pilot symbol range by the unit of 32 DigRF packets. The pilot symbol range specification unit 316 identifies the DigRF packet that includes an error symbol based on the error symbol information from the error symbol part determination unit 308. In the example illustrated in FIG. 4, the pilot symbol range specification unit 316 identifies a DigRF packet whose DigRF packet address is "18". The pilot symbol range specification unit 316 identifies DigRF packets other than the packet whose DigRF packet address is "18". The pilot symbol range specification unit 316 specifies DigRF packets other than the packet whose DigRF packet address is "18", as the pilot symbol range information. Specifically, the pilot symbol range specification unit 316 specifies the DigRF packets whose DigRF packet addresses are 0-17 and 19-31, as the pilot symbol range information.

After having specified the pilot symbol range information, the pilot symbol range specification unit 316 executes the same process for the next 32 DigRF packets.

The SIR calculation unit 332 is connected with the pilot symbol range specification unit 316 and the retransmission control unit 306. The SIR calculation unit 332 calculates an SIR based on the DigRF packet from the retransmission control unit 306 and the pilot symbol range information from the pilot symbol range specification unit 316. Specifically, the SIR calculation unit 332 calculates likelihood for eight chips included in the DigRF packet by taking a quarter chip as one sample. The SIR calculation unit 332 calculates the likelihood for pilot symbols specified by the pilot symbol range information. The SIR calculation unit 332 sums the calculation results of the likelihood, and outputs the average value as the SIR.

<Case where an Error is Not Detected in DigRF Packet>

Figure 5:
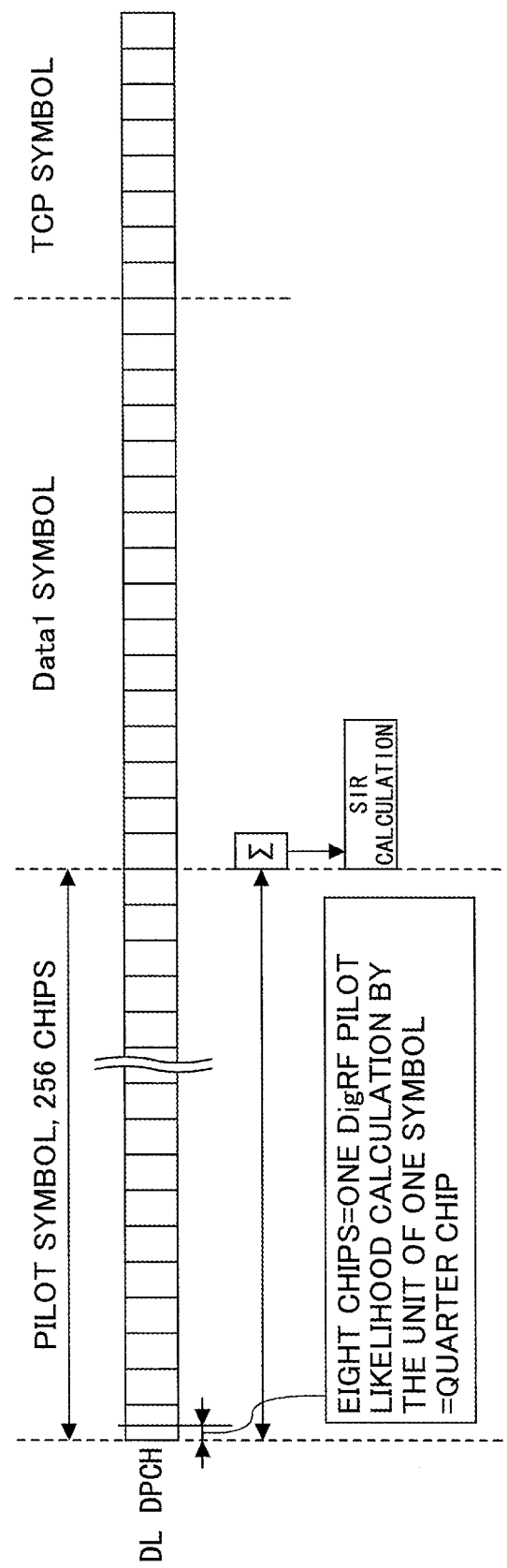
FIG. 5 illustrates an example of a process for calculating an SIR.

FIG. 5 illustrates an SIR calculation process when an error is not detected in a DigRF packet. If an error is not detected in the DigRF packet, the retransmission control unit 306 does not input error DigRF packet information into the error symbol part determination unit 308. Alternatively, if an error is not detected in the DigRF packet, the retransmission control unit 306 may input information representing that an error is not detected, into the error symbol part determination unit 308.

Moreover, the error symbol part determination unit 308 does not input error symbol information into the pilot symbol range specification unit 316. Alternatively, the error symbol part determination unit 308 may input information representing that an error is not detected, into the pilot symbol range specification unit 316. Therefore, the pilot symbol range specification unit 316 does not input pilot symbol range information into the SIR calculation unit 332. Alternatively, the pilot symbol range specification unit 316 may input information specifying the entire range as the pilot symbol range information, into the SIR calculation unit 332. In this case, the SIR calculation unit 332 calculates the SIR based on the DigRF packet from the retransmission control unit 306. Specifically, the SIR calculation unit 332 calculates likelihood for 256 chips included in the DigRF packet by taking a quarter chip as one sample. The SIR calculation unit 332 sums the calculation results of the likelihood, and takes the average to calculate the SIR used for calculating a transmission TPC bit.

<Case where an Error is Detected in DigRF Packet>

Figure 6:
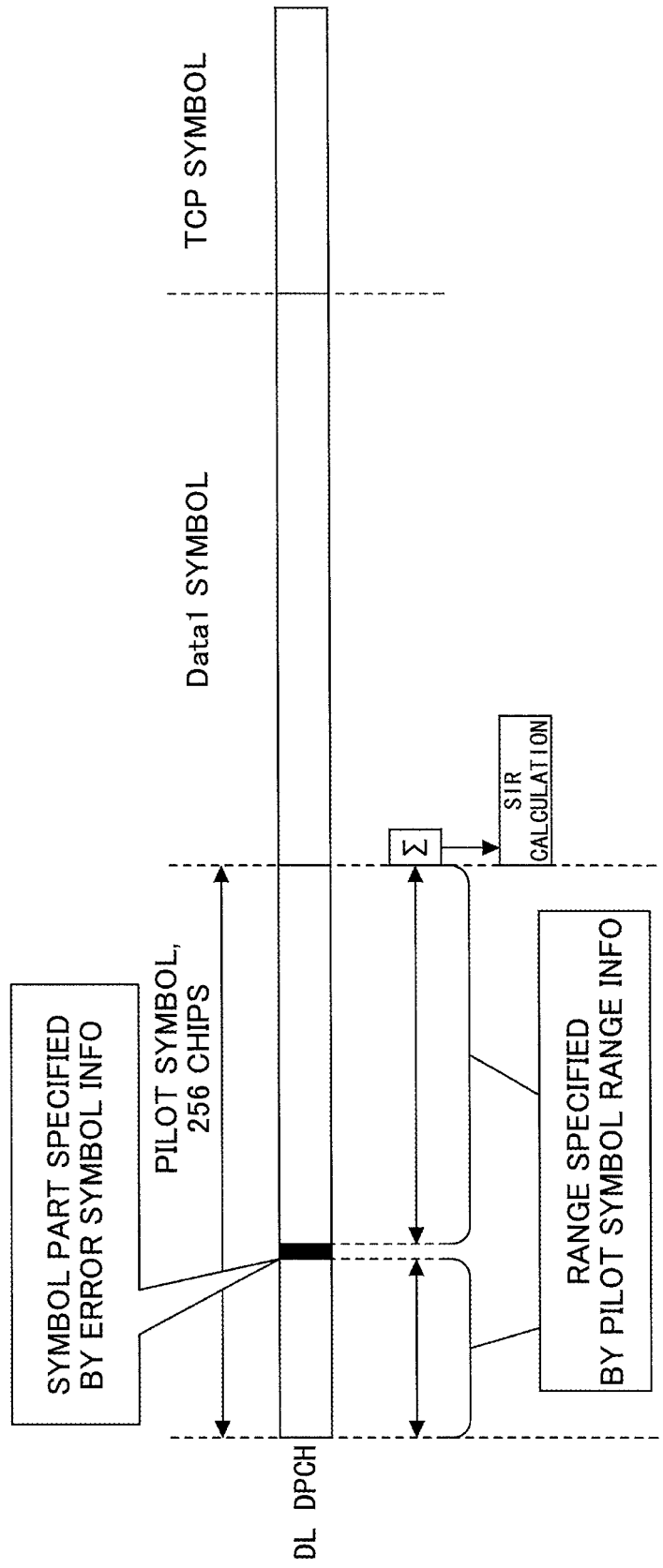
FIG. 6 illustrates an example of a process for calculating an SIR.

FIG. 6 illustrates an SIR calculation process when an error is detected in a DigRF packet. If an error is detected in the DigRF packet, the retransmission control unit 306 inputs the error DigRF packet information into the error symbol part determination unit 308.

The error symbol part determination unit 308 determines an error symbol location based on the error DigRF packet information from the retransmission control unit 306. The error symbol part determination unit 308 inputs the error symbol information into the pilot symbol range specification unit 316.

The pilot symbol range specification unit 31 specifies a range of pilot symbols used for calculating a transmission TPC bit based on the error symbol information from the error symbol part determination unit 308. Specifically, as illustrated in FIG. 6, the pilot symbol range specification unit 316 identifies a DigRF packet that includes a symbol designated by the error symbol location specified in the error symbol information. The pilot symbol range specification unit 316 sets the range of the pilot symbols included in DigRF packets other than the identified DigRF packet, as the range of the pilot symbols used for calculating a transmission TPC bit. The pilot symbol range specification unit 316 inputs the pilot symbol range information into the SIR calculation unit 332.

The SIR calculation unit 332 calculates an SIR based on the DigRF packet from the retransmission control unit 306 and the pilot symbol range information from the pilot symbol range specification unit 316. Specifically, the SIR calculation unit 332 calculates likelihood for eight chips included in the DigRF packet by taking a quarter chip as one sample. The SIR calculation unit 332 calculates the likelihood for the pilot symbols specified by the pilot symbol range information. For example, if an error is detected in the DigRF packet, the SIR calculation unit 332 calculates the likelihood for 248 chips, which is obtained by subtracting eight chips from 256 chips included in 32 DigRF packets, by taking a quarter chip as one sample. The SIR calculation unit 332 sums the calculation results of the likelihood, and outputs the average value as the SIR. If there are a small number of DigRF packets in which errors are detected, it is assumed the influence on the SIR is tolerable even if the likelihood is calculated based on DigRF packets other than the DigRF packet.

The transmission TPC bit determination unit 334 is connected with the SIR calculation unit 332. The transmission TPC bit determination unit 334 calculates a transmission TPC bit based on the SIR from the SIR calculation unit 332. For example, the transmission TPC bit determination unit 334 may calculate a transmission TPC bit so that the SIR from the SIR calculation unit 332 becomes a predetermined SIR. The transmission TPC bit determination unit 334 inputs the transmission TPC bit into the encoding unit 336.

The encoding unit 336 is connected with the transmission TPC bit determination unit 334. The encoding unit 336 encodes the transmission TPC bit from the transmission TPC bit determination unit 334. The encoding unit 336 inputs the encoded transmission TPC bit (referred to as the "encoded transmission TPC bit" below) into the modulation unit 338.

The modulation unit 338 is connected with the encoding unit 336. The modulation unit 338 modulates the encoded transmission TPC bit from the encoding unit 336. The modulation unit 338 inputs the modulated encoded transmission TPC bit into the transmission unit 342.

The transmission unit 342 is connected with the modulation unit 338 and the transmission power calculation unit 340. The transmission unit 342 executes a process for transmitting the modulated encoded transmission TPC bit from the modulation unit 338 based on information about a calculation result of transmission power from the transmission power calculation unit 340. When executing the process for transmitting the encoded transmission TPC bit, the transmission unit 342 controls transmission timing following a transmission timing signal from the despreading unit 318.

<Transmission Power Control Process>

Figure 7:
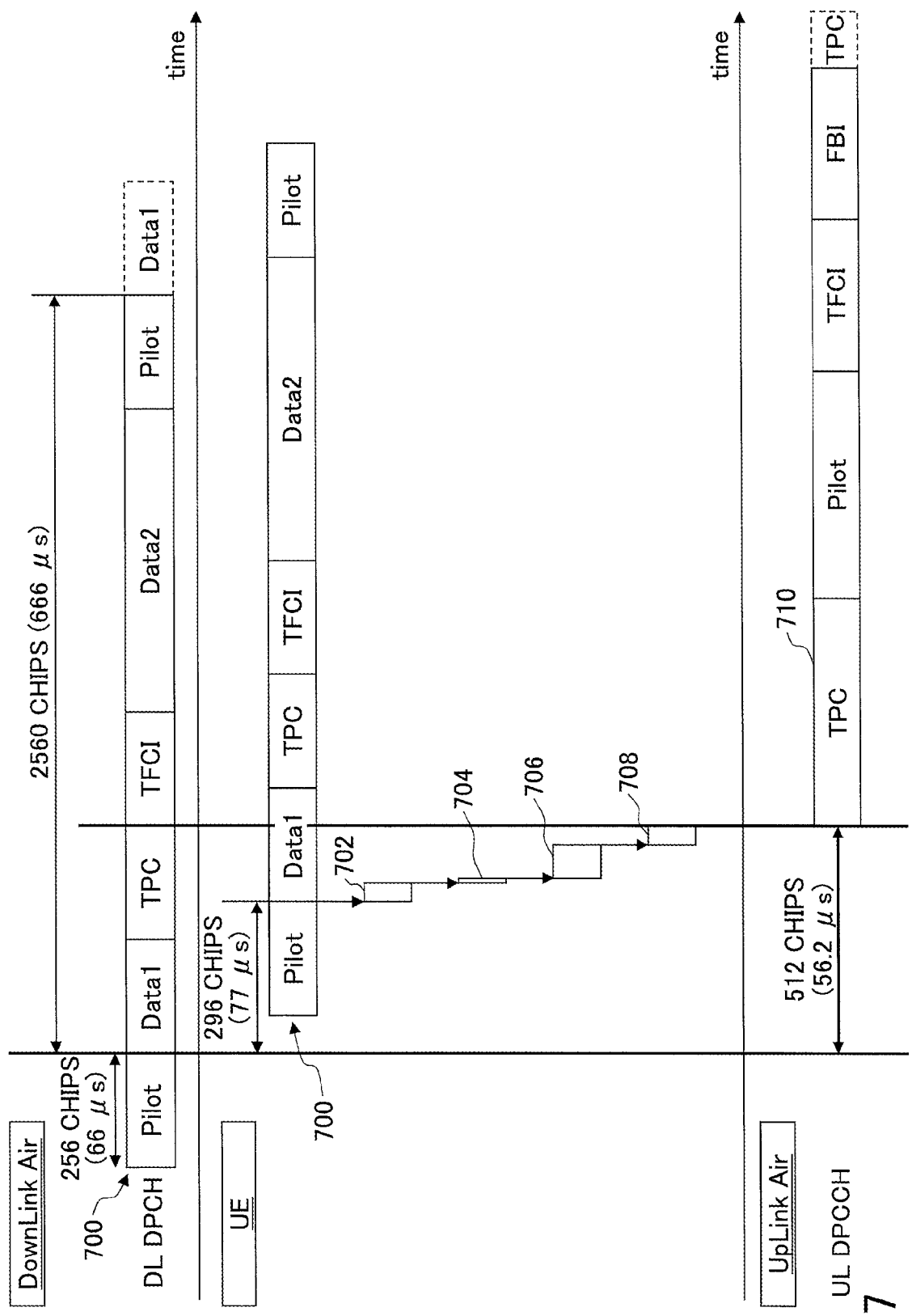
FIG. 7 is a timing chart of transmission power control according to an embodiment of the present invention.

FIG. 7 is a timing chart of a transmission power control process in the wireless apparatus 100 according to the present embodiment. In FIG. 7, a state is illustrated as an example where a delay offset of a maximum of 296 chips is generated by a soft handover (SHO).

The 3GPP specifies that an SIR is calculated after receiving a downlink DPCH, by demodulating a pilot symbol that is mapped in the tenth symbol of the DPCH.

The 3GPP also specifies that a transmission TPC bit is mapped in a TPC included in an uplink DPCCH that comes at timing of 512 chips after the reception of the pilot symbol.

The downlink DPCH generates the delay offset of the maximum of 296 chips during the soft handover. Considering the delay offset of the DPCH, the uplink DPCCH having the transmission TPC bit mapped needs to be transmitted at a timing of 216 chips (512 chips−296 chips) after the reception of the pilot symbol.

The RFIC 200 receives the downlink DPCH 700, and generates a DigRF packet. The RFIC 200 transmits the DigRF packet to the baseband processing apparatus 300 (702). Note that if an error is detected in the DigRF packet, the baseband processing apparatus 300 executes a retransmission control process of the data. However, the baseband processing apparatus 300 calculates a transmission TPC bit without waiting for the arrival of the retransmission data by the retransmission control.

The baseband processing apparatus 300 determines the error symbol location of the DigRF packet (704). Next, the baseband processing apparatus 300 calculates the transmission TPC bit based on chips included in DigRF packets other than the DigRF packet including the error symbol, and executes the process for transmitting the transmission TPC bit (706). Specifically, the baseband processing apparatus 300 maps the transmission TPC bit into the uplink DPCCH.

The baseband processing apparatus 300 transmits the uplink DPCCH having the transmission TPC bit mapped to the RFIC 200 (708).

The RFIC 200 transmits the uplink DPCCH from the baseband processing apparatus 300.

By calculating the transmission TPC bit without waiting for the arrival of the retransmission data by the retransmission control, the wireless apparatus 100 can transmit the uplink DPCCH having the transmission TPC bit mapped, at a timing of 216 chips after the reception of the pilot. Therefore, even if an error is detected in the packet from the RFIC 200, the baseband processing apparatus 300 in the wireless apparatus 100 can transmit the uplink DPCCH having the transmission TPC bit mapped, at the timing of 216 chips after the reception of the pilot. Therefore, a delay time can be shortened for transmission power control for the wireless apparatus 100 by the other wireless apparatus, especially by a base station.

<SIR Calculation Process>

Figure 8:
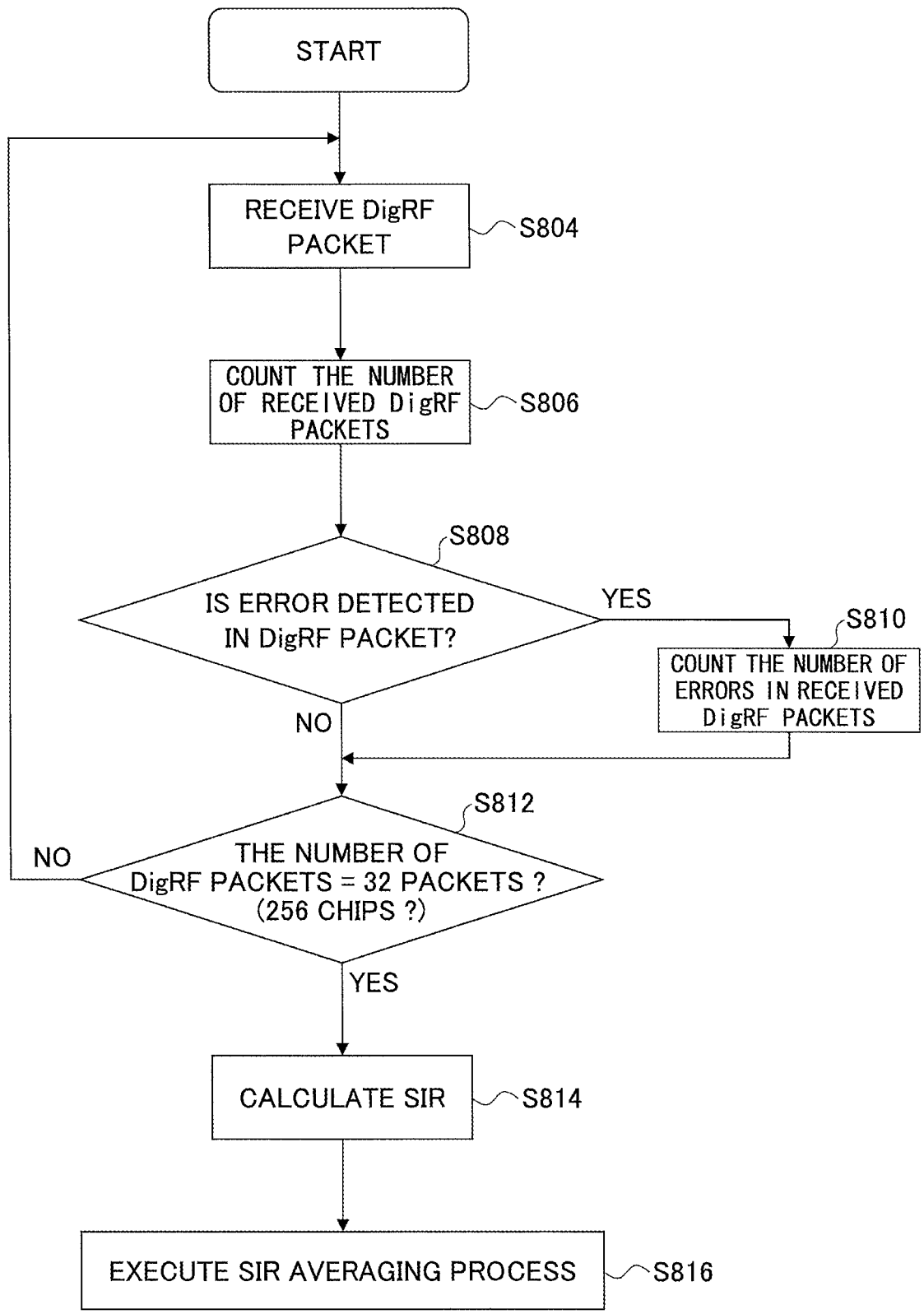
FIG. 8 is a flowchart of a process for calculating an SIR according to an embodiment of the present invention.

FIG. 8 is a flowchart of a process for calculating an SIR according to the present embodiment. FIG. 8 mainly illustrates a process executed by the error symbol part determination unit 308, the pilot symbol range specification unit 316, and the SIR calculation unit 332.

At Step S804, the SIR calculation unit 332 receives a DigRF packet from the retransmission control unit 306.

At Step S806, the SIR calculation unit 332 counts the number of DigRF packets from the retransmission control unit 306.

At Step S808, the error symbol part determination unit 308 determines whether an error is detected in the DigRF packet based on error DigRF packet information from the retransmission control unit 306.

At Step S810, if it is determined at Step S808 that an error is detected in the DigRF packet, the pilot symbol range specification unit 316 counts the number of DigRF packets in which errors are detected. Specifically, the pilot symbol range specification unit 316 sets "1" to a part corresponding to the DigRF packet in which an error is detected in the table illustrated in FIG. 4 for counting the number of DigRF packets in which errors are detected.

At Step S812, if it is determined at Step S808 that an error is not detected in the DigRF packet, the following steps are executed. Namely, the pilot symbol range specification unit 316 sets "0" to the part corresponding to the DigRF packet in which an error is not detected in the table illustrated in FIG. 4. After that, the pilot symbol range specification unit 316 determines whether the number of DigRF packets reach 32. The pilot symbol range specification unit 316 may determine whether the number of chips reach 256.

The following is also executed in Step S812 after setting "1" to the part corresponding to the DigRF packet in which the error is detected. Namely, the pilot symbol range specification unit 316 determines whether the number of DigRF packets reach 32. The pilot symbol range specification unit 316 may determine whether the number of chips reach 256.

At Step S814, if it is determined at Step S812 that the number of DigRF packets reach 32, the SIR calculation unit 332 calculates an SIR. The SIR calculation unit 332 calculates likelihood based on the pilot symbols in the range specified by the pilot symbol range information, by taking a quarter chip as one sample. The SIR calculation unit 332 sums the calculation results of the likelihood. Namely, the SIR calculation unit 332 sums the likelihood calculated for chips included in DigRF packets other than the DigRF packet that includes the symbol in which an error is detected.

If it is determined at Step S812 that the number of DigRF packets does not reach 32, the process goes back to Step S804.

At Step S816, the SIR calculation unit 332 executes an averaging process of the SIR. Namely, the SIR calculation unit 332 obtains the number of samples by excluding DigRF packets in which errors are detected, from the 32 DigRF packets. The SIR calculation unit 332 executes the averaging process of the SIR by dividing the total value of the likelihood by the number of samples.

<Operations of Wireless Apparatus 100>

Figure 9A:
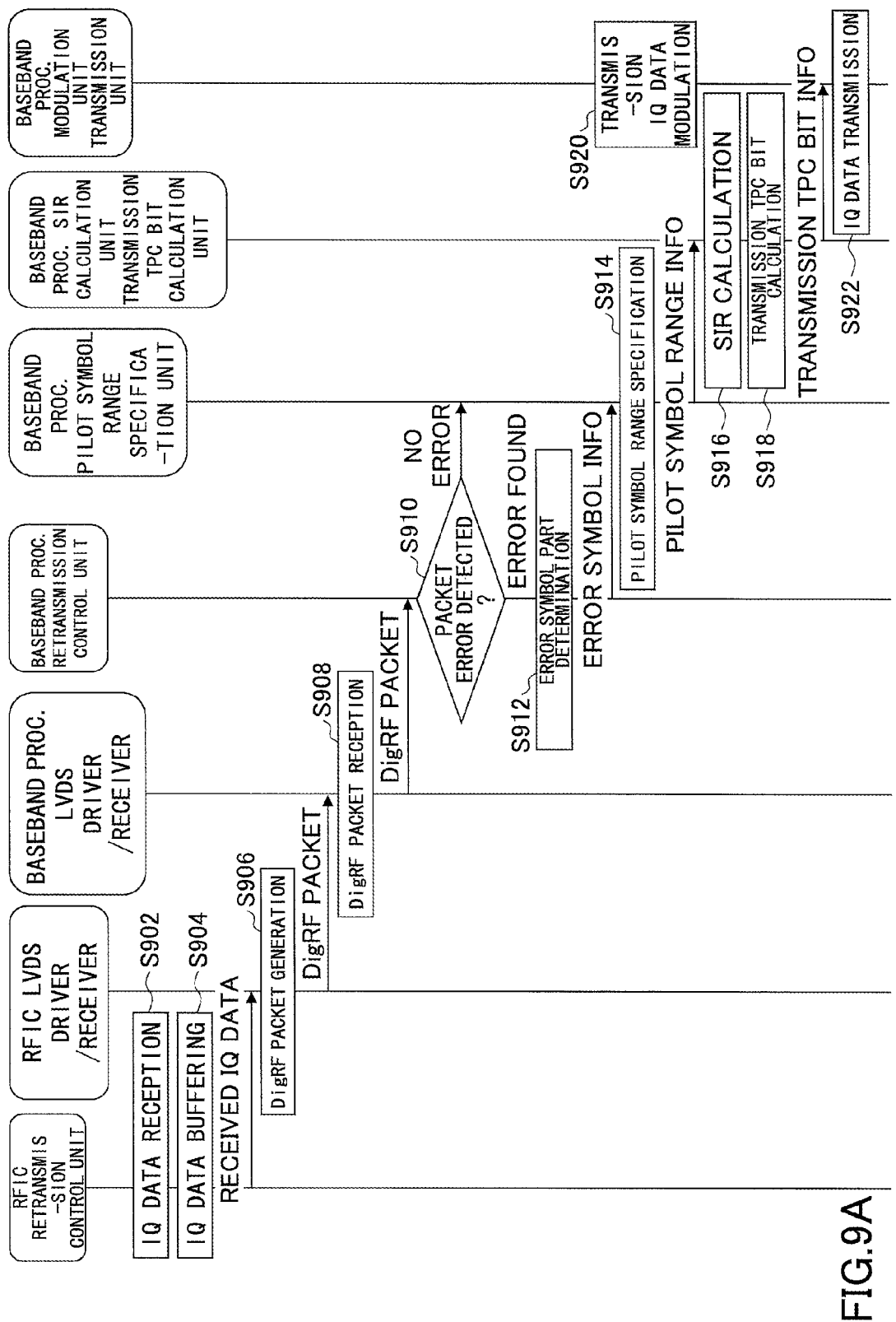
FIG. 9A is a flowchart of operations of a wireless apparatus according to an embodiment of the present invention.
Figure 9B:
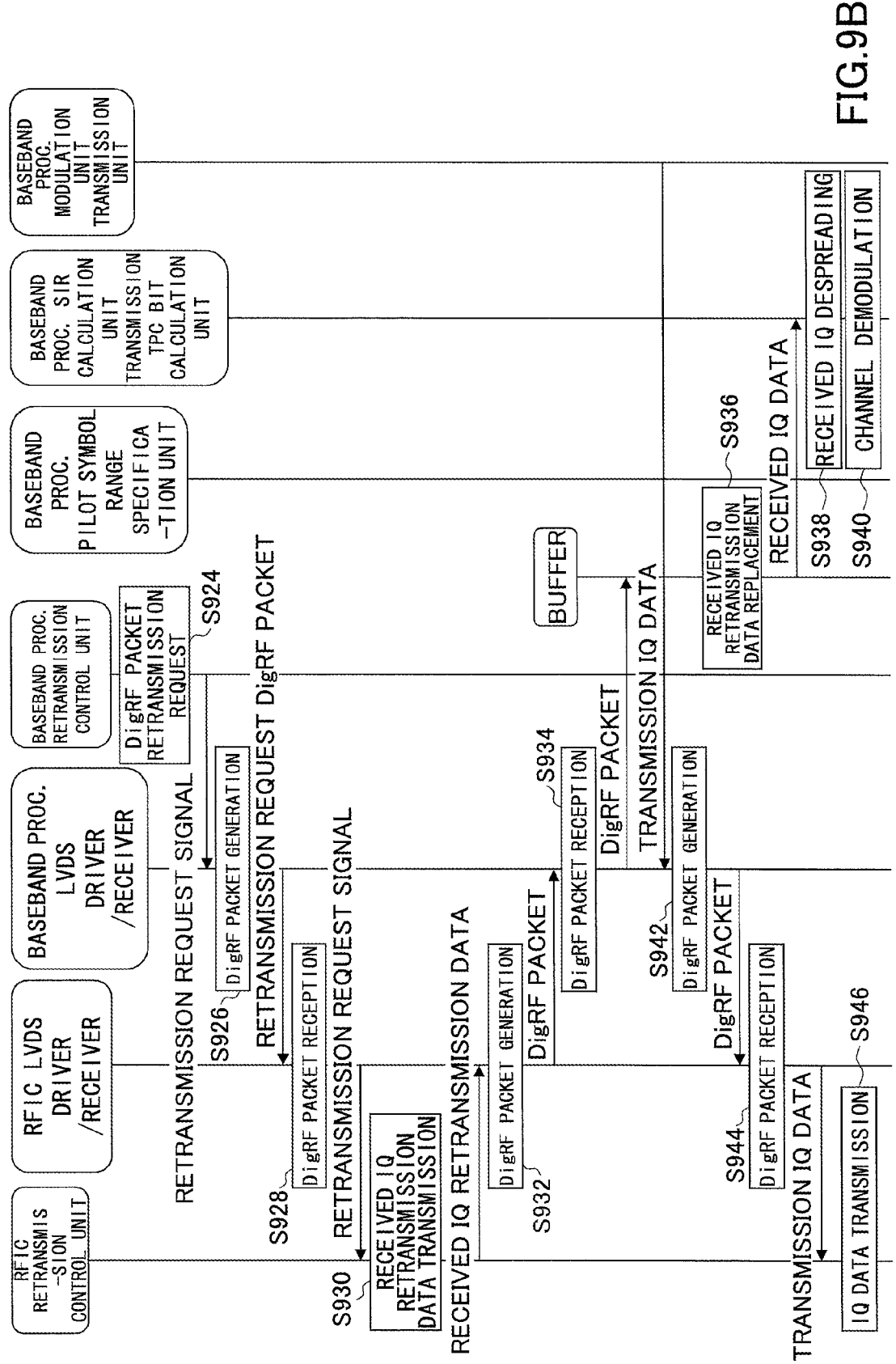
FIG. 9B is a flowchart of operations of a wireless apparatus according to an embodiment of the present invention.

FIGS. 9A-9B illustrate operations of the wireless apparatus 100 according to the present embodiment.

The wireless apparatus 100 operates in accordance with DigRF v4.

At Step S902, the RFIC 200 receives a wireless signal from the other wireless apparatus. Namely, the retransmission control unit 208 receives IQ data as input from the RxADC 202.

At Step S904, the retransmission control unit 208 executes buffering of the IQ data, and inputs the IQ data to the LVDS driver 212.

At Step S906, the LVDS driver 212 generates a DigRF packet of the IQ data from the retransmission control unit 208. The LVDS driver 212 outputs the DigRF packet to the LVDS receiver 304.

At Step S908, the LVDS receiver 304 receives the DigRF packet from the RFIC 200. The LVDS receiver 304 inputs the DigRF packet from the RFIC 200 into the retransmission control unit 306.

At Step S910, the retransmission control unit 306 determines whether a data error is detected in the DigRF packet from the LVDS receiver 304.

At Step S912, if a data error is detected in the DigRF packet from the LVDS receiver 304 at Step S910, the error symbol part determination unit 308 determines the symbol in which the error is detected. The error symbol part determination unit 308 inputs the error symbol information into the pilot symbol range specification unit 316.

At Step S914, the pilot symbol range specification unit 316 specifies the range of pilot symbols used for calculating the transmission TPC bit based on the error symbol information from the error symbol part determination unit 308. The pilot symbol range specification unit 316 inputs the pilot symbol range information into the SIR calculation unit 332.

At Step S916, the SIR calculation unit 332 executes an SIR calculation process.

At Step S918, the transmission TPC bit determination unit 334 calculates the transmission TPC bit based on the SIR calculated by the SIR calculation unit 332.

At Step S920, the modulation unit 338 executes a modulation process of the IQ data to be transmitted.

At Step S922, the transmission unit 342 transmits the transmission TPC bit calculated by the transmission TPC bit determination unit 334 and the IQ data modulated at Step S920.

At Step S924, the retransmission control unit 314 makes a retransmission-request of the DigRF packet.

At Step S926, the LVDS driver 312 generates a DigRF packet of the retransmission-request signal from the retransmission control unit 314. The LVDS driver 312 transmits the DigRF-packeted retransmission-request signal to the RFIC 200.

At Step S928, the LVDS receiver 214 receives the DigRF-packeted retransmission-request signal from the LVDS driver 312. The LVDS receiver 214 inputs the retransmission-request signal into the retransmission control unit 210.

At Step S930, the retransmission control unit 210 makes a retransmission-request to the retransmission control unit 208 based on the retransmission-request signal from the LVDS receiver 214. In response to the retransmission-request from the retransmission control unit 210, the retransmission control unit 208 inputs the IQ data to be retransmitted into the LVDS driver 212.

At Step S932, the LVDS driver 212 generates a DigRF packet of the IQ data from the retransmission control unit 208 for retransmission. The LVDS driver 212 outputs the DigRF packet to the LVDS receiver 304.

At Step S934, the LVDS receiver 304 receives the DigRF packet from the RFIC 200. The LVDS receiver 304 inputs the DigRF packet from the RFIC 200 into the buffer 310 via the retransmission control unit 306.

At Step S936, the buffer 310 replaces IQ data among the stored IQ data that corresponds to the IQ data retransmitted from the retransmission control unit 306. Namely, the buffer 310 updates the IQ data among the stored IQ data that corresponds to the IQ data retransmitted from the retransmission control unit 306. The buffer 310 inputs the stored IQ data into the despreading unit 318.

At Step S938, the despreading unit 318 executes a despreading process for the IQ data from the buffer 310.

At Step S940, the CPICH demodulation unit 320 demodulates the CPICH. Also, at Step S940, the DPCH demodulation unit 320 demodulates the DPCH.

At Step S942, the LVDS driver 312 generates a DigRF packet of the IQ data transmitted from the transmission unit 342. The LVDS driver 312 transmits the DigRF-packeted IQ data to the LVDS receiver 214.

At Step S944, the LVDS receiver 214 receives the DigRF packet from the baseband processing apparatus 300. The LVDS receiver 214 converts the DigRF packet from the baseband processing apparatus 300 into IQ data. The LVDS receiver 214 inputs the IQ data into the TxDAC 204 via the retransmission control unit 210.

At Step S946, the TxDAC 204 transmits the IQ data from the LVDS receiver 214.

By the operations of the wireless apparatus 100 in the present embodiment illustrated in FIGS. 9A-9B, the transmission TPC bit is calculated without waiting for the arrival of the retransmission data by the retransmission control. Therefore, the wireless apparatus 100 can shorten time for transmitting the uplink DPCCH having the transmission TPC bit mapped after the reception of a pilot.

Figure 10:
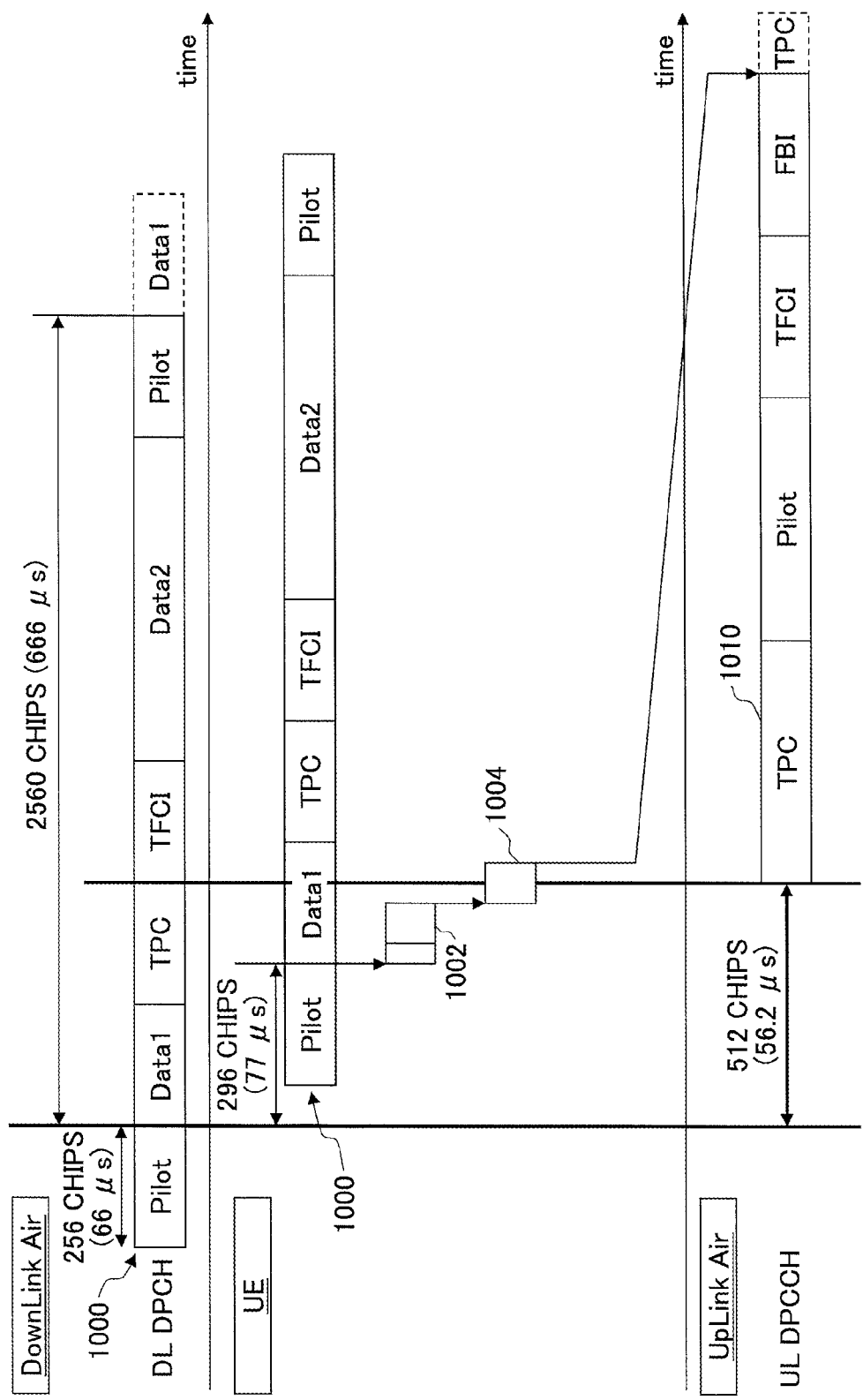
FIG. 10 is a timing chart of an example of transmission power control.

FIG. 10 illustrates an example where an SIR is calculated after waiting for retransmission of a DigRF packet if an error is detected in the DigRF packet from the RFIC.

In FIG. 10, similarly to FIG. 7, a state is illustrated as an example where a delay offset of a maximum of 296 chips is generated by a soft handover.

The RFIC receives a downlink DPCH 1000, and generates a DigRF packet. The RFIC transmits the DigRF packet to the baseband processing apparatus (1002). Note that if an error is detected in the DigRF packet, the baseband processing apparatus makes a retransmission-request of the data. In response to the retransmission-request from the baseband processing apparatus, the DigRF packet corresponding to the retransmission-request is retransmitted from the RFIC. Namely, the retransmission control is executed for the DigRF packet. Therefore, the box 1002 includes transfer time and retransmission time.

The baseband processing apparatus transmits the transmission TPC bit (1004). Specifically, the baseband processing apparatus calculates an SIR based on DigRF packets including the retransmitted DigRF packet, and calculates the transmission TPC bit. The baseband processing apparatus generates an uplink DPCCH including the transmission TPC bit. There are cases where time of 216 chips passes after the reception of the pilot at this moment. Although the 3GPP specifies that the transmission TPC bit is mapped into a TPC included in an uplink DPCCH at timing of 512 chips after the reception of the pilot symbol, it is too late.

The baseband processing apparatus generates a DigRF packet of the uplink DPCCH including the transmission TPC bit, and transfers it to the RFIC. The RFIC transmits the uplink DPCCH including the transmission TPC bit (1010). In this case, the transmission TPC bit is mapped into a next slot.

In the transmission power control process illustrated in FIG. 7, the retransmitted DigRF packet is not used for calculating the transmission TPC bit. Therefore, time can be shortened for retransmission of the DigRF packet for the process of calculating the transmission TPC bit after the reception of the pilot.

According to the present embodiment, if an error is detected in a DigRF packet from the RFIC 200, the uplink DPCCH having the transmission TPC bit mapped can be transmitted at a timing of 216 chips after the reception of the pilot. Namely, time can be shortened for transmission of the uplink DPCCH having the transmission TPC bit mapped after the reception of the pilot.

According to the present embodiment, in the wireless apparatus in accordance with DigRF v4, if an error is detected in a DigRF packet from the RFIC, the baseband processing apparatus calculates an SIR based on DigRF packets other than the DigRF packet.

The baseband processing apparatus calculates the transmission TPC bit based on the SIR calculated based on DigRF packets other than the DigRF packet in which an error is detected. In this way, a process for calculating the transmission TPC bit is not influenced even if a retransmission process of a DigRF packet is executed. Namely, it is possible to shorten delay of transmission power control caused by delay of transmission of the transmission TPC bit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless apparatus comprising:
a wireless unit configured to convert a wireless signal received by an antenna into a baseband signal; and
a baseband processing apparatus configured
to receive a packet corresponding to the baseband signal via a communication line connected with the wireless unit,
to detect whether an error occurs in a transmission process of the packet via the communication line, the packet being received from the wireless unit via the communication line,
to obtain the baseband signal based on a plurality of packets other than the packet in which the error is detected without waiting for arrival of retransmission data transmitted in a retransmission control process of the packet in which the error is detected,
to generate transmission power information used for downlink transmission power control, based on the obtained baseband signal,
to transmit the baseband signal including the generated transmission power information to the wireless unit via the communication line, and to have the wireless unit execute uplink wireless transmission of a wireless signal corresponding to the baseband signal including the transmission power information.

2. The wireless apparatus as claimed in claim 1, wherein the baseband processing apparatus calculates, for every predetermined number of packets, an average value of reception quality based on the baseband signal corresponding to a plurality of chips included in the packets other than the packet in which the error is detected, and generates the transmission power information based on the average value.

3. The wireless apparatus as claimed in claim 1, wherein the baseband processing apparatus executes error detection in a DPCH, and outputs a DPCCH including the transmission power information to the wireless unit.

4. The wireless apparatus as claimed in claim 1, wherein the wireless unit includes a driver configured to generate a DigRF packet of the baseband signal converted from the received wireless signal,
  wherein the baseband processing apparatus includes a driver configured to receive the DigRF packet from the driver of the wireless unit via the communication line, and to detect whether the error occurs in the received DigRF packet in the transmission process via the communication line.

5. A baseband processing apparatus having an interface to connect with a wireless unit via a communication line, the wireless unit being configured to convert a wireless signal received by an antenna into a baseband signal, the baseband processing apparatus comprising:
  a processor configured
    to receive a packet corresponding to the baseband signal via a communication line connected with the wireless unit,
    to detect whether an error occurs in a transmission process of the packet via the communication line,
    to obtain the baseband signal based on a plurality of packets other than the packet in which the error is detected without waiting for arrival of retransmission data transmitted in a retransmission control process of the packet in which the error is detected,
    to generate transmission power information used for downlink transmission power control, based on the obtained baseband signal,
    to transmit the baseband signal including the generated transmission power information to the wireless unit via the communication line, and
    to have the wireless unit execute uplink wireless transmission of a wireless signal corresponding to the baseband signal including the transmission power information.

6. A communication method executed by a processor, the method comprising:
  receiving a packet corresponding to a baseband signal via a communication line connected with a wireless unit;
  detecting whether an error occurs in a transmission process of the packet via the communication line;
  obtaining the baseband signal based on a plurality of packets other than the packet in which the error is detected without waiting for arrival of retransmission data transmitted in a retransmission control process of the packet in which the error is detected;
  generating transmission power information used for downlink transmission power control, based on the obtained baseband signal;
  transmitting the baseband signal including the generated transmission power information to the wireless unit via the communication line; and
  having the wireless unit execute uplink wireless transmission of a wireless signal corresponding to the baseband signal including the transmission power information.

* * * * *